United States Patent
Niesen et al.

(10) Patent No.: US 9,524,271 B2
(45) Date of Patent: Dec. 20, 2016

(54) DISTRIBUTED COMPUTATION OF LINEAR COMBINATIONS IN A NETWORK

(71) Applicant: ALCATEL-LUCENT USA INC, Murray Hill, NJ (US)

(72) Inventors: Urs Niesen, Murray Hill, NJ (US); Piyush Gupta, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 380 days.

(21) Appl. No.: 14/152,518

(22) Filed: Jan. 10, 2014

(65) Prior Publication Data

US 2015/0201000 A1  Jul. 16, 2015

(51) Int. Cl.
  *G06F 15/16* (2006.01)
  *G06F 17/10* (2006.01)
  *H04L 29/08* (2006.01)

(52) U.S. Cl.
  CPC .............. *G06F 17/10* (2013.01); *H04L 67/12* (2013.01)

(58) Field of Classification Search
  CPC . H04B 7/15592; H04B 7/0417; H04B 7/0634; H04L 25/03159; H04L 25/0204; H04L 25/0212; H04L 25/0216; H04L 25/022; H04L 25/0224
  See application file for complete search history.

(56) References Cited

U.S. PATENT DOCUMENTS

| | | | |
|---|---|---|---|
| 2002/0122470 A1* | 9/2002 | Heikkila | H04B 1/71052 375/147 |
| 2011/0103402 A1* | 5/2011 | Achir | H03M 13/1105 370/474 |
| 2011/0116581 A1* | 5/2011 | Yamada | H04B 7/0413 375/341 |
| 2012/0218891 A1* | 8/2012 | Sundararajan | H04L 47/27 370/231 |
| 2014/0222748 A1* | 8/2014 | Mermoud | H04L 41/142 706/52 |

OTHER PUBLICATIONS

Ralf Koetter, Muriel Medard An algebraic approach to network codin, IEEE/ACM Transactions on Networking (TON) archive, vol. 11 Issue 5, Oct. 2003, pp. 782-795.*
Tracy Ho et al., "A Random Linear Network Coding Approach to Multicast", IEEE Transactions on Information Theory, Oct. 2006, 18 pages.

* cited by examiner

*Primary Examiner* — Djenane Bayard
(74) *Attorney, Agent, or Firm* — Davidson Sheehan LLP

(57) ABSTRACT

A first source node transmits a first transmission vector formed by multiplying a vector of input values and an inverse of a transfer matrix that relates vectors transmitted from the first source node via a plurality of intermediate nodes to vectors received at a plurality of destination nodes. Each of the intermediate nodes transmits a vector formed by a linear operation performed on received vectors. The linear operation may be determined based on linear combinations of the first transmission vector and one or more second transmission vectors transmitted by second source nodes. The linear combinations are to be received at the destination nodes. The linear operation is chosen so that propagation of the first transmission vector through the intermediate nodes produces, at the destination nodes, predetermined linear combinations of the first transmission vector and one or more second transmission vectors transmitted by one or more second source nodes.

20 Claims, 6 Drawing Sheets

DISTRIBUTED COMPUTATION OF LINEAR COMBINATIONS IN A NETWORK

STATEMENT REGARDING FEDERALLY SPONSORED RESEARCH OR DEVELOPMENT

This invention was made with government support under #FA9550-09-1-0317 awarded by the Air Force Office of Scientific Research. The government has certain rights in the invention.

BACKGROUND

Field of the Disclosure

The present disclosure relates generally to communication networks and, more particularly, to combining information from multiple nodes in a communication network.

Description of the Related Art

Large computations sometimes need to be performed by distributing the computation over multiple processing devices and combining the results using information exchanged over a network. For example, data mining operations may require multiplying two matrices that are too large to be stored in the memory of a single processing device. Portions of the matrix multiplication may therefore be performed in different processing devices (e.g. at source nodes) and the results may be combined by another set of processing devices (e.g., at destination nodes) to produce the final result of the matrix multiplication. For another example, results of measurements performed by sensors in a sensor network may need to be combined or added at other nodes in the sensor network. The conventional approach is to transmit information from the source nodes to the destination nodes over communication links (e.g., edges) in the network. The destination nodes may then combine the results to produce the desired output. However, the overhead required to transmit all of the individual results over the edges of the network may severely tax the resources of the network. For example, a significant portion (or all) of the bandwidth of the communication links may be consumed by transmitting the information produced at the source nodes to the destination nodes, which may result in lags, transmission failures, inefficient power consumption, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The network resources needed to produce a predetermined linear combination of input data (which is available at a plurality of source nodes) at a plurality of destination nodes can be reduced by pre-coding the messages transmitted from the source nodes so that linear operations performed at intermediate nodes in the network automatically produce the desired linear combinations at the destination nodes. An additional benefit is that the interference between the messages is also canceled by choosing the pre-coding appropriately. In some embodiments, a vector of input values from the source nodes is pre-coded using an invertible transfer function that relates the vectors transmitted by each source node to the vectors received by each destination node. For example, each of the source nodes can precode a vector of input values by multiplying the vector of input values with the inverse of the invertible transfer function. The source node can then transmit the resulting vector towards intermediate nodes in the network. Each intermediate node performs a linear operation to generate a linear combination of received vectors and then transmits the resulting vector to other nodes in the network. The invertible transfer function is determined by the linear operation performed by the intermediate nodes.

The linear operation is chosen so that propagation of messages from the source nodes through the intermediate nodes that perform the linear operation produces the predetermined linear combination of the input values at the destination nodes. The linear operation may be random or deterministic. For example, each of the intermediate nodes may randomly select a set of weights to perform a linear combination of the received vectors over a finite field, e.g., $\mathbb{F}_{2^K}$. The length K of a block of information that is transmitted by each source node is selected to be large enough that the resulting transfer function is (with high probability) invertible. For another example, the intermediate nodes may perform a predetermined linear combination of the received signals such as binary addition (e.g., exclusive-OR or XOR) of the received signals over the finite field, $\mathbb{F}_2$. The predetermined linear combination is chosen such that an invertible transfer function is produced by the combined effects of the intermediate nodes. Precoding the vectors transmitted from the source nodes using the invertible transfer function results in the destination nodes receiving the predetermined linear combination of the vector of input values while also canceling interference produced by other vectors transmitted from the source nodes.

Figure 1:
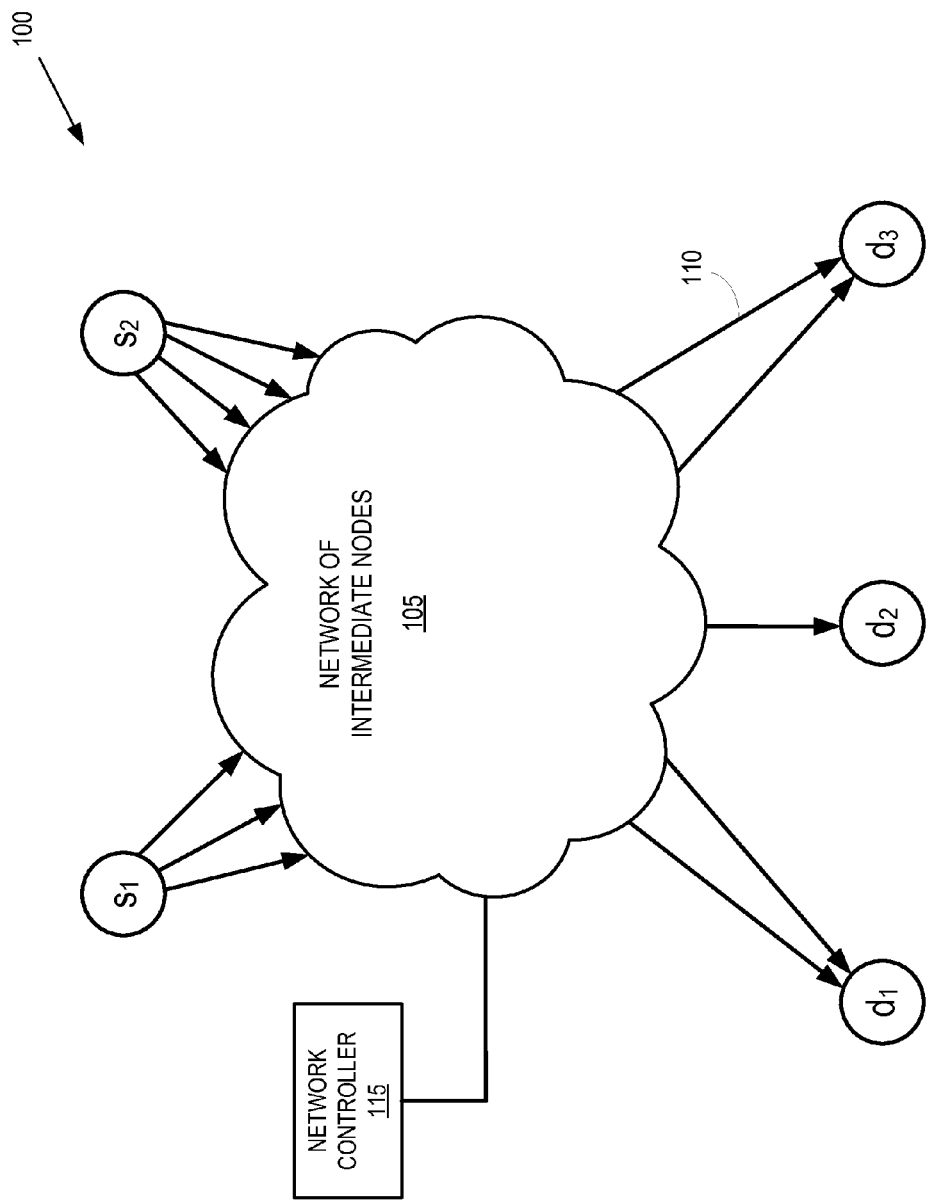
FIG. 1 is a block diagram of a communication network according to some embodiments.

FIG. 1 is a block diagram of a communication network 100 according to some embodiments. The network 100 includes a plurality of source nodes ($s_1$, $s_2$) and a plurality of destination nodes ($d_1$, $d_2$, $d_3$). The source nodes ($s_1$, $s_2$) and the destination nodes ($d_1$, $d_2$, $d_3$) communicate with each other over a network of intermediate nodes 105. As used herein, the terms "node" or "vertex" may be used interchangeably and refer to entities that are able to generate, transmit, receive, or process messages. For example, a server may be a node or a vertex in a data mining network, a base station may be a node or vertex in a wireless communication network, and a sensor may be a node or vertex in a sensor network. The source nodes ($s_1$, $s_2$) and the destination nodes ($d_1$, $d_2$, $d_3$) are interconnected by a plurality of communication links or edges 110 (only one edge is indicated by a reference numeral in FIG. 1 in the interest of clarity). As used herein, the terms "link" or "edge" may be used interchangeably and refer to the medium that conveys messages between nodes in the network 100. The links or edges may have a direction that indicates the direction of information flow along the link or edge, e.g., the link 110 is directed from an intermediate node to the destination node $d_3$. The communication links or edges may be wired communication links, wireless communication links, or a combination thereof.

Each of the source nodes ($s_1$, $s_2$) is able to generate a vector of input values and each of the destination nodes ($d_1$, $d_2$, $d_3$) is to receive a predetermined linear combination of the input values. For example, the source node ($s_1$) may generate a vector of input values ($a_1$, $a_2$, $a_3$) and the source node ($s_2$) may generate a vector of input values ($b_1$, $b_2$, $b_3$). The destination nodes ($d_1$, $d_2$, $d_3$) may need to receive a predetermined linear combination of the input values such as sums of the input values over a finite field such as the finite field $\mathbb{F}_2$. For example, the destination node ($d_1$) may need to receive the finite field sum $a_1 \oplus b_1$, the destination node ($d_2$) may need to receive the finite field sum $a_2 \oplus b_2$, and the destination node ($d_2$) may need to receive the finite field sum $a_3 \oplus b_3$.

The intermediate nodes in the network of intermediate nodes 105 may each perform a linear operation on received vectors to generate a vector for transmission to other nodes. The linear operation may also be referred to as the network code for the network of intermediate nodes 105. The linear operations are chosen so that propagation of the messages from source nodes ($s_1$, $s_2$) through the network of intermediate nodes 105 produces the predetermined linear combinations at the destination nodes ($d_1$, $d_2$, $d_3$). The linear operations may be determined by the individual intermediate nodes in the network of intermediate nodes 105 or they may be determined by another entity such as a network controller 115 and then provided to the network of intermediate nodes 105. The linear operation may be deterministic (e.g., each intermediate node may perform an addition of its received vectors over the finite field), non-deterministic, or random (e.g., each intermediate node may apply randomly selected weights to its received vectors before performing an addition of the weighted vectors over the finite field).

Transfer functions may be defined for each of the source nodes ($s_1$, $s_2$) based on the linear operations performed in the network of intermediate nodes 105. For example, each of the source nodes ($s_1$, $s_2$) may transmit a pilot signal to the network of intermediate nodes 105 to the destination nodes ($d_1$, $d_2$, $d_3$). Upon receipt of the pilot signals, the destination nodes ($d_1$, $d_2$, $d_3$) may return corresponding feedback signals to the source nodes ($s_1$, $s_2$) via the network of intermediate nodes 105. Each of the source nodes ($s_1$, $s_2$) can then compare its transmitted pilot signal to the received feedback signal to determine a transfer function that represents the effects of propagation of signals or messages through the network of intermediate nodes to each of the destination nodes ($d_1$, $d_2$, $d_3$). The transfer function for each source node ($s_1$, $s_2$) may therefore relate values of the vectors transmitted from the source nodes ($s_1$, $s_2$) to values of the vectors received at the destination nodes ($d_1$, $d_2$, $d_3$). Deterministic network codes may be chosen such that the transfer function is guaranteed to be invertible. For non-deterministic or random network codes, the block size for messages transmitted by the source nodes ($s_1$, $s_2$) can be selected so that the transfer function is invertible with high probability, as discussed herein. The network code may be modified if the transfer function is not invertible until an invertible transfer function is found.

Messages transmitted by the source nodes ($s_1$, $s_2$) can be precoded by multiplying the message by an inverse of the transfer function. The source nodes ($s_1$, $s_2$) may then transmit the resulting precoded transmission vector towards the destination nodes ($d_1$, $d_2$, $d_3$) via the network of intermediate nodes 105. As discussed in detail below, precoding the messages using the inverse of the transfer function that is determined based on the network code implemented in the network of intermediate nodes 105 causes the network of intermediate nodes 105 to produce the predetermined linear combination of input values at the destination nodes ($d_1$, $d_2$, $d_3$). Thus, the network of intermediate nodes 105 computes the predetermined linear combination of input values at the destination nodes ($d_1$, $d_2$, $d_3$) as it conveys the information used to compute the linear combination. Additionally, as discussed in detail below, the network of intermediate nodes 105 cancels interference between the messages transmitted by the source nodes ($s_1$, $s_2$).

Figure 2:
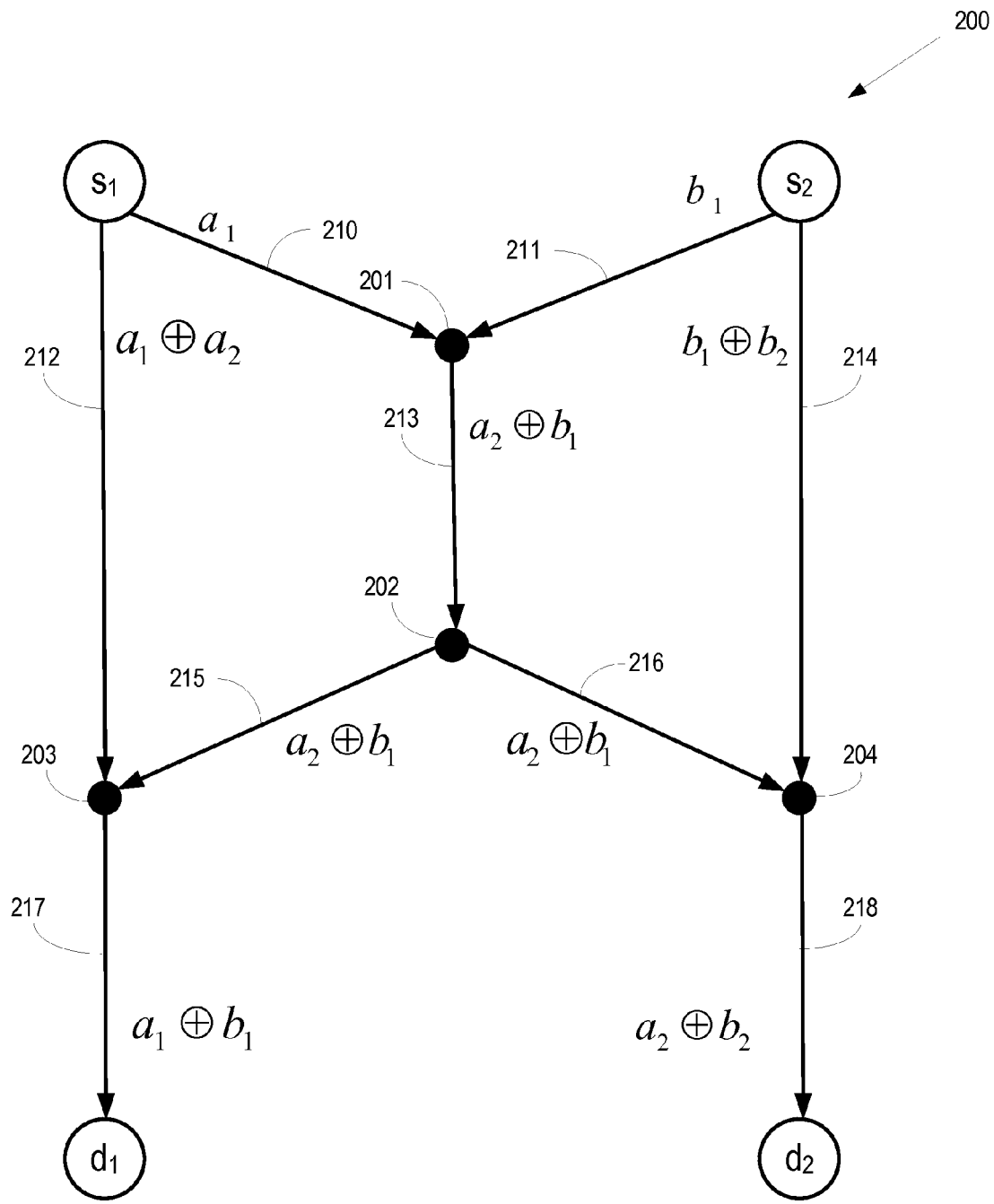
FIG. 2 is a diagram of a butterfly network with two source nodes ($s_1$, $s_2$) and two destination nodes ($d_1$, $d_2$) according to some embodiments.

FIG. 2 is a diagram of a butterfly network 200 with two source nodes ($s_1$, $s_2$) and two destination nodes ($d_1$, $d_2$) according to some embodiments. The source nodes ($s_1$, $s_2$) communicate with the two destination nodes ($d_1$, $d_2$) via intermediate nodes 201, 202, 203, 204 (collectively referred to herein as the intermediate nodes 201-204) and edges 210, 211, 212, 213, 214, 215, 216, 217, 218 (collectively referred to herein as the edges 210-218). For ease of notation, messages transmitted by the source node ($s_1$) are denoted $a_d$ and messages transmitted by the source node ($s_2$) are denoted $b_d$. The network code implemented in the butterfly network 200 is a sum or addition over the finite field $\mathbb{F}_2$ performed by each of the intermediate nodes 201-204. The block size for the transmitted messages is chosen to be K=1. Each intermediate node 201-204 sums all signals received on its incoming edges and transmits the sum over its outgoing edges.

The network code for the butterfly network can be constructed to produce a predetermined linear combination at the destination nodes ($d_1$, $d_2$). In one embodiment, the destination node ($d_1$) is to receive predetermined linear combination $a_1 \oplus b_1$ and the destination node ($d_2$) is to receive predetermined linear combination $a_2 \oplus b_2$. Each of the intermediate vertices 201-204 in the butterfly network 200 may therefore be configured to perform the linear operation of addition ($\oplus$) of all incoming signals. The transfer matrices from the sources ($s_1$, $s_2$) to the destination nodes ($d_1$, $d_2$) can be defined as $H_s \in \mathbb{F}_2^{2 \times 2}$. Thus, if source s transmits the vector $x_s$ over its outgoing edges, then the two destinations receive the corresponding element in the vector signal:

$$H_1 x_1 \oplus H_2 x_2$$

over their incoming edges. Adopting the convention that the edges coming out of the sources are labeled from left to right, the transfer matrices for the butterfly network 200 can be defined as:

$$H_1 = \begin{pmatrix} 1 & 1 \\ 0 & 1 \end{pmatrix}$$

and

-continued $$H_2 = \begin{pmatrix} 1 & 0 \\ 1 & 1 \end{pmatrix}.$$

If the source $s_1$ transmits:

$$x_1 = H_1^{-1}\begin{pmatrix} a_1 \\ a_2 \end{pmatrix} = \begin{pmatrix} 1 & 1 \\ 0 & 1 \end{pmatrix}\begin{pmatrix} a_1 \\ a_2 \end{pmatrix} = \begin{pmatrix} a_1 \oplus a_2 \\ a_2 \end{pmatrix}$$

and the source $s_2$ transmits:

$$x_2 = H_2^{-1}\begin{pmatrix} b_1 \\ b_2 \end{pmatrix} = \begin{pmatrix} 1 & 0 \\ 1 & 1 \end{pmatrix}\begin{pmatrix} b_1 \\ b_2 \end{pmatrix} = \begin{pmatrix} b_1 \\ b_1 \oplus b_2 \end{pmatrix}$$

then the destination nodes ($d_1$, $d_2$) receive the desired sums:

$$H_1 x_1 \oplus H_2 x_2 = H_1 H_1^{-1}\begin{pmatrix} a_1 \\ a_2 \end{pmatrix} \oplus H_2 H_2^{-1}\begin{pmatrix} b_1 \\ b_2 \end{pmatrix} = \begin{pmatrix} a_1 \oplus b_1 \\ a_2 \oplus b_2 \end{pmatrix}.$$

The signals in the butterfly network 200 are therefore aligned to perform the desired computation and cancel interference. For example, the first source $s_1$ sends $a_1 \oplus a_2$ over its first outgoing edge 212 and $a_2$ over its second outgoing edge 210. The second source $s_2$ sends $b_2$ over its first outgoing edge 211 and $b_1 \oplus b_2$ over its second outgoing edge 214. The intermediate vertex 203 with edge 212 to the first destination $d_1$ receives two signals $a_1 \oplus a_2$ and $a_2 \oplus b_1$ over its incoming edges 212, 215. The second signal from the first source $a_2$ is not required at the first destination $d_1$ and hence can be considered interference. The interference $a_2$ is present in both signals $a_1 \oplus a_2$ and $a_2 \oplus b_1$ and is consequently removed by the vertex 203 when the vertex 203 performs the linear operation of addition over the finite field $\mathbb{F}_2$. Performing the linear operation of addition over the finite field $\mathbb{F}_2$ at the vertex 203 also generates the desired sum $a_1 \oplus b_1$ of the signals provided by the two sources, which can then be provided to the first destination $d_1$. The desired signal and the interference are therefore aligned.

The sum that is desired at the second destination $d_2$ is also calculated by the network 200. In this case, the interference $b_1$ is present in both signals $a_2 \oplus b_1$ and $b_1 \oplus b_2$ and is consequently removed by the vertex 204 when the vertex performs the linear operation of addition over the finite field $\mathbb{F}_2$. Performing the linear operation of addition over the finite field $\mathbb{F}_2$ at the vertex 204 also generates the desired sum $a_2 \oplus b_2$ of the signals provided by the two sources, which can then be provided to the first destination $d_1$. This example illustrates that the proposed solution to the problem of distributed computation of multiple sums over a network satisfies an end-to-end principle. In other words, the network itself is "dumb" and only performs simple linear combinations of all incoming signals at each vertex. The "smart" operations happen at the edge of the network, where the sources have to invert the transfer matrix to the destinations and precode transmitted messages using the inverted transfer matrix.

Figure 3:
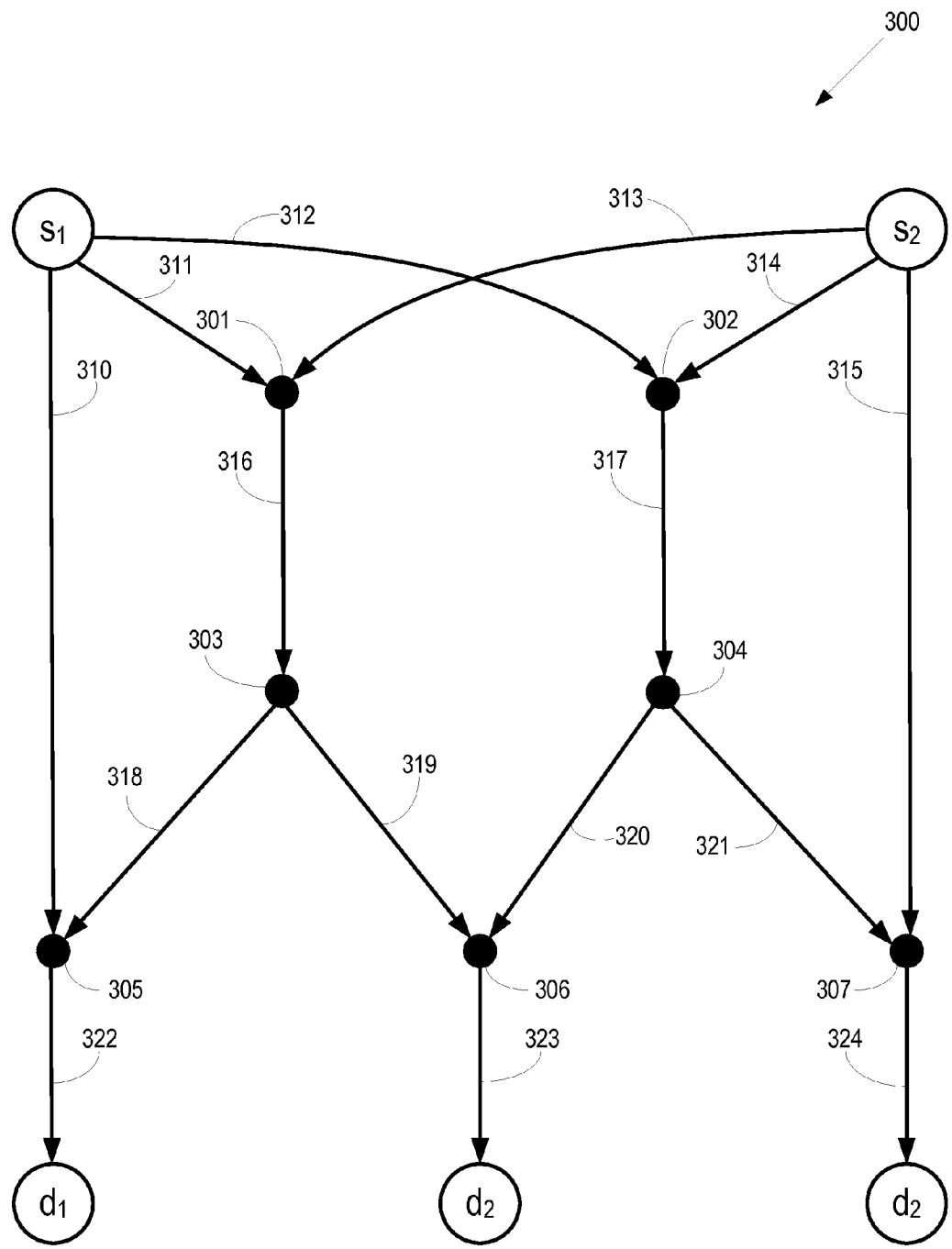
FIG. 3 is a diagram of a double butterfly network that includes two source nodes ($s_1$, $s_2$) and three destination nodes ($d_1$, $d_2$, $d_3$) according to some embodiments.

FIG. 3 is a diagram of a double butterfly network 300 that includes two source nodes ($s_1$, $s_2$) and three destination nodes ($d_1$, $d_2$, $d_3$) according to some embodiments. The source nodes ($s_1$, $s_2$) communicate with the destination nodes ($d_1$, $d_2$, $d_3$) via intermediate nodes 301, 302, 303, 304, 305, 306, 307, (collectively referred to herein as the intermediate nodes 301-307) and edges 310, 311, 312, 313, 314, 315, 316, 317, 318, 319, 320, 321, 322, 323, 324 (collectively referred to herein as the edges 310-324). For ease of notation, messages transmitted by the first source are denoted $a_d$ and messages transmitted by the second source are denoted $b_d$. The network code implemented in the intermediate nodes 301-307 of the double butterfly network 300 is a sum or addition over the finite field $\mathbb{F}_2$ and thus the block size for messages is K=1. Each intermediate vertex 301-307 in the double butterfly network 300 sums all signals received on the incoming edges 310-324 and transmits the sum over all outgoing edges 310-324.

The network code for the double butterfly network 300 can be constructed to produce a predetermined linear combination at the destination nodes ($d_1$, $d_2$, $d_3$). In one embodiment, the destination node ($d_1$) is to receive predetermined linear combination $a_1 \oplus b_1$, the destination node ($d_2$) is to receive predetermined linear combination $a_2 \oplus b_2$, and the destination node ($d_3$) is to receive predetermined linear combination $a_3 \oplus b_3$. Each of the intermediate vertices 301-307 in the double butterfly network 300 may therefore be configured to perform the linear operation of addition ($\oplus$) of all incoming signals. The transfer matrices from the source $s$ to the destinations can then be defined as $H_s \in \mathbb{F}_2^{3 \times 3}$.

Adopting the convention that the edges coming out of the sources are labeled from left to right, the transfer matrices for the double butterfly network 300 can be defined as:

$$H_1 = \begin{pmatrix} 1 & 1 & 0 \\ 0 & 1 & 1 \\ 0 & 0 & 1 \end{pmatrix}$$

and $$H_2 = \begin{pmatrix} 1 & 0 & 0 \\ 1 & 1 & 0 \\ 0 & 1 & 1 \end{pmatrix}$$

If the source $s_1$ transmits:

$$x_1 = H_1^{-1}\begin{pmatrix} a_1 \\ a_2 \\ a_3 \end{pmatrix} = \begin{pmatrix} 1 & 1 & 1 \\ 0 & 1 & 1 \\ 0 & 0 & 1 \end{pmatrix}\begin{pmatrix} a_1 \\ a_2 \\ a_3 \end{pmatrix} = \begin{pmatrix} a_1 \oplus a_2 \oplus a_3 \\ a_2 \oplus a_3 \\ a_3 \end{pmatrix}$$

and the source $s_2$ transmits:

$$x_2 = H_2^{-1}\begin{pmatrix} b_1 \\ b_2 \\ b_3 \end{pmatrix} = \begin{pmatrix} 1 & 0 & 0 \\ 1 & 1 & 0 \\ 1 & 1 & 1 \end{pmatrix}\begin{pmatrix} b_1 \\ b_2 \\ b_3 \end{pmatrix} = \begin{pmatrix} b_1 \\ b_1 \oplus b_2 \\ b_1 \oplus b_2 \oplus b_3 \end{pmatrix}$$

then the destinations received the desired sums:

$$H_1 x_1 \oplus H_2 x_2 = H_1 H_1^{-1}\begin{pmatrix} a_1 \\ a_2 \\ a_3 \end{pmatrix} \oplus H_2 H_2^{-1}\begin{pmatrix} b_1 \\ b_2 \\ b_3 \end{pmatrix} = \begin{pmatrix} a_1 \oplus b_1 \\ a_2 \oplus b_2 \\ a_3 \oplus b_3 \end{pmatrix}.$$

The network code embodied in the double butterfly network 300 exhibits alignment. For example, the first source $s_1$ sends the message $a_1 \oplus a_2 \oplus a_3$ over its first outgoing edge 310, $a_1 \oplus a_2$ over its second outgoing edge 311, and $a_2$ over its third outgoing edge 312. The second source $s_2$ sends $b_2$ over its first outgoing edge 313, $b_1 \oplus b_2$ over its second outgoing edge 314, and $b_1 \oplus b_2 \oplus b_3$ over its third outgoing edge 315. The intermediate vertex 305 with an edge 322 to the first destination $d_1$ receives $a_1 \oplus a_2 \oplus a_3$ and $b_1 \oplus a_2 \oplus a_3$ over its two incoming edges 310, 318. At the vertex 305, the portion $a_2 \oplus a_3$ is interference. Since this term is present in both the received signals, the interference is aligned and can be removed through the addition operation performed at the vertex 305 according to the network code. At the same time, the desired signals $a_1$ and $b_1$ at the vertex 305 are also aligned and adding the signals according to the network code performs the desired linear operation $a_1 \oplus b_1$.

Alignment of the interference and the desired signals is also visible at the other two intermediate vertices 306, 307 connected to the destinations $d_2$ and $d_3$. For example, at the vertex 306 connected to the destination $d_2$, the linear combination $b_1 \oplus a_3$ is interference while $a_2$ and $b_2$ are desired signals. The same signal $b_1 \oplus a_2 \oplus a_3$ is received from the vertex 303 by the vertex 305 connected to $d_1$ over the edge 318 and the vertex 306 connected to $d_2$ over the edge 319. At each of these vertices 305, 306, different parts of the signal are interference and desired signal. The signal $b_1 \oplus a_2 \oplus a_3$ should be aligned with respect to both of these vertices 305, 306. The signal received by the vertices 305, 306 is thus over constrained. However, both alignment constraints can be satisfied simultaneously. Feasibility of the simultaneous alignment is due to the judicious choice of the signal injected by the sources, as discussed below.

Although the embodiments depicted in FIG. 2 and FIG. 3 illustrate the process of configuring and operating the butterfly network 200 and the double butterfly network 300, respectively, other embodiments can generalize the technique to arbitrary linear functions over the finite field $\mathbb{F}_q$ and edge signals over the finite field $\mathbb{F}_{q^K}$. The extension of the computation to arbitrary linear operations or linear functions follows by pre-multiplying every message from the source s by the appropriate coefficient as determined by the linear combinations of the input data requested or expected by destination d.

To demonstrate the achievability and feasibility of the general solution to configuring a network to use a network code to generate predetermined linear combinations at destination nodes, consider the following problem. Let G=(V, E) be a directed acyclic graph with vertices V and edges E. A subset $S \subset V$ of the vertices are source nodes and a disjoint subset $D \subset V$ are destination nodes. The notation may be simplified by setting:

$$S \triangleq |S|$$

$$D \triangleq |D|.$$

The number of source nodes S and the number of destination nodes D may not necessarily be the same in all embodiments. Each source node $s \in S$ has access to K messages $w_{sd}[1], w_{sd}[2], \ldots, w_{sd}[K]$ for each destination node $d \in D$. Each of these messages has a value defined over the binary field $\mathbb{F}_2$ and thus in total there are KDS binary messages. Each destination node d in the illustrated embodiment aims to compute a linear combination represented by the K sums:

$$\bigoplus_{s \in S} w_{sd}[k]$$

with $k \in \{1, 2, \ldots, K\}$ and where the sum is over the binary field $\mathbb{F}_2$ as indicated by using the "exclusive-OR" summation symbol, $\oplus$, instead of the conventional addition summation symbol, $\Sigma$.

Each edge in the network is able to carry a signal in $\mathbb{F}_{2^K}$ between the two vertices that are connected by the edge. The signal is carried in the direction of the orientation of the edge. A network code describes the linear operations performed at the vertices in the network by specifying how each vertex maps the signals received over its incoming edges to signals that are sent over its outgoing edges. For a fixed value of the block size K, the network code solves the multiple sums computation problem over the network G if the destination vertices D are able to compute predetermined linear combinations (e.g., the multiple sums) for every possible value of the KDS binary messages. The multiple sums computation problem over the network G is feasible if there exists a value of the block size K and a network code of length K that solves this problem over the network G. Some embodiments discussed herein illustrate the computation and communication of signals over the binary field $\mathbb{F}_2$. However, embodiments of these techniques may be extended to general fields $\mathbb{F}_q$. Some embodiments may also be used to compute arbitrary linear combinations (with potentially different coefficients at each destination node) instead of computing simple sums or additions.

In some embodiments, the multiple sums computation is performed over the network G with S sources S and D destinations D assuming that for every source $s \in S$ and every subset of destination nodes $\tilde{D} \subset D$ the (vertex) min cut between s and D is at least $|\tilde{D}|$. This may be referred to as a cut condition. For example, the graph G may represent the network 100 shown in FIG. 1, which satisfies a cut condition so that a network code exists to perform the multiple sums computation problem described herein. The general graph G can then be converted or transformed into a standardized form and a network code can be constructed for the standardized form of the graph.

Figure 4:
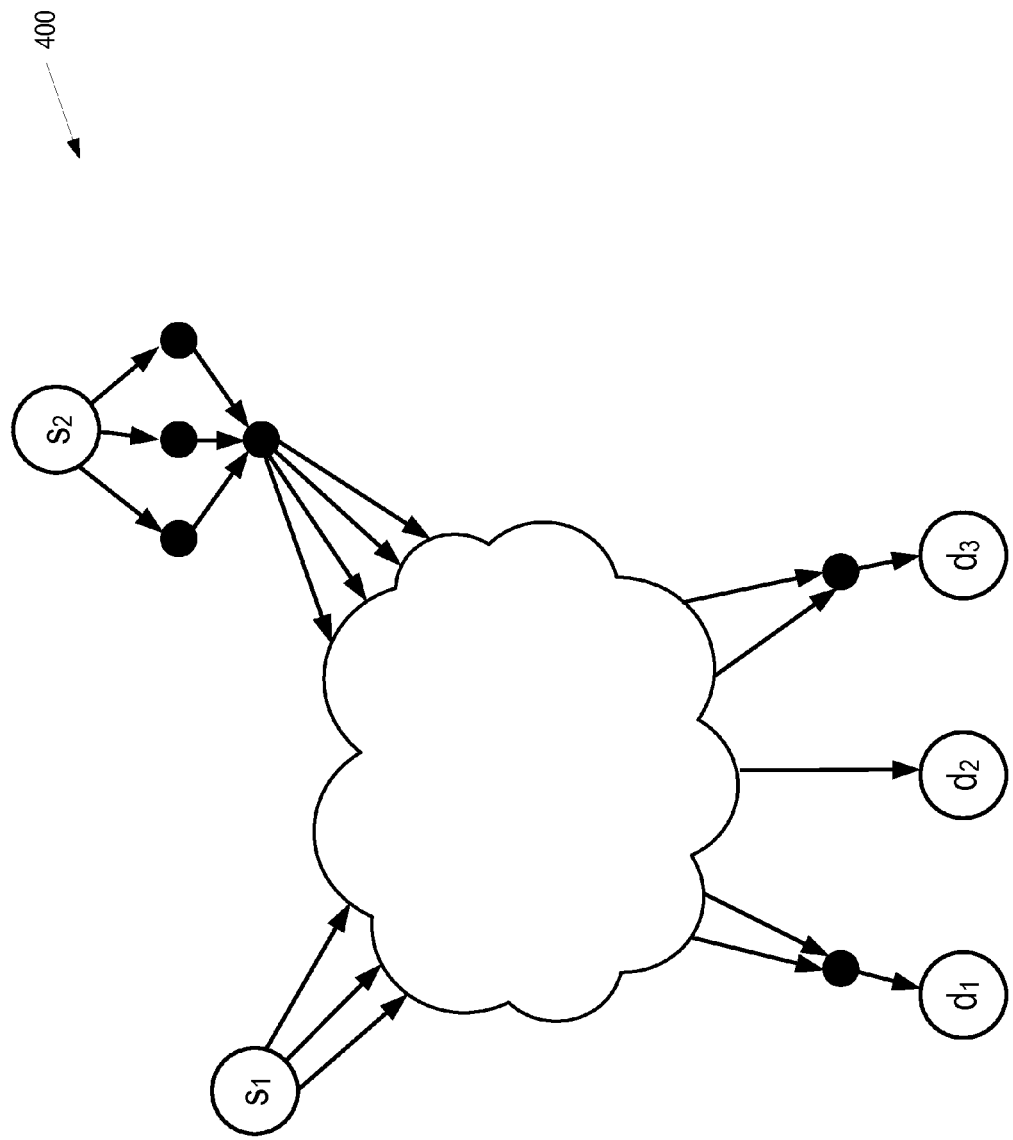
FIG. 4 is a diagram that illustrates conversion of a multiple sums computation problem over the communication network shown in FIG. 1 into a standard form according to some embodiments.

FIG. 4 is a diagram that illustrates conversion of a multiple sums computation problem over the communication network 100 shown in FIG. 1 into a standard form 400 according to some embodiments. In some embodiments, each source node $s \in S$ has exactly D outgoing edges and that each destination node $d \in D$ has exactly one incoming edge. For example, each source node shown in FIG. 4 has D=3 outgoing edges. However, some embodiments may have different numbers of outgoing edges from some or all of the source nodes or different numbers of in going edges to each destination node. Beginning with the source nodes $s \in S$, the cut condition implies that each source node has at least D outgoing edges. Consider a source s with strictly more than D outgoing edges. Add D+1 additional vertices (as depicted in FIG. 4 by the solid circles connected to the source $s_2$), declaring one of the additional vertices to be a new source. The new source is connected to the other D new vertices and the other D new vertices are connected to the original source s, as shown in FIG. 4. The modified graph also satisfies the cut condition. One can therefore assume without loss of generality that each source s in the original graph has exactly D outgoing edges.

Continuing with the destination nodes $d \in D$, the cut condition implies that each destination node d has at least one incoming edge. A destination node d with more than one incoming edge can be converted into a destination node with a single incoming edge. For example, one additional vertex d' (as depicted in FIG. 4 by the solid circles connected to the destinations $d_1$ and $d_3$) may be added to the graph and declare the new vertex to be the new destination node, as shown in FIG. 4. Connect the previous destination node d to the new destination node d'. The modified graph also satisfies the cut condition.

One embodiment of a network, which may be referred to as a "normalized" network, includes sources such that every source has exactly D outgoing edges and every destination node has exactly one incoming edge. The block length K may be fixed to a particular value so that the network edges carry symbols over the finite field $\mathbb{F}_{2^K}$. The intermediate vertices perform random linear network coding over the finite field. For example, assume a vertex $v \in \tilde{V}$ as in-degree i and out-degree o. Let $y_v \in \mathbb{F}_{2^K}^i$ and $x_v \in \mathbb{F}_{2^K}^o$ be the input and output vectors of that vertex. The vertex creates the output vector $x_v$ using the linear operation:

$$x_v = A_v y_v,$$

where $A_v \in \mathbb{F}_{2^K}^{o \times i}$. The coefficients of the matrices $A_v$ for all intermediate vertices $v \in V \setminus \{S \cup D\}$ are chosen independently and uniformly at random from the finite field $\mathbb{F}_{2^K}$.

Once the coding matrices $A_v$ at the intermediate vertices are fixed, the end-to-end mapping of the signals sent by the source nodes to the signals received by the destination nodes can be considered. Assume source node $s \in S$ transmits the signal $x_s \in \mathbb{F}_{2^K}^D$, noting that, by the normalization assumption, all source vectors have the same number of elements D. Let $y_d \in \mathbb{F}_{2^K}$ be the signal received by the destination nodes $d \in D$, noting that by the normalization assumption each destination node observes a scalar signal.

Form the Vector:

$$y \triangleq (y_d)_{d \in D} \in \mathbb{F}_{2^K}^D$$

of received signal at the destination nodes. Since all operations of the network are linear, the mapping between $(x_s)_{s \in S}$ and y is also linear. Thus, the input-output relationship is:

$$y = \Sigma_{s \in S} H_s x_s \quad (1)$$

with transfer matrix $H_s \in \mathbb{F}_{2^K}^{D \times D}$ for every $s \in S$, and where the sum is over the finite field $\mathbb{F}_{2^K}$.

For large enough block length K, all S square matrices $\{H_s\}_{s \in S}$ are invertible with high probability. Consider one source s and the corresponding transfer matrix $H_s$. This matrix can be interpreted as describing the operations of a network with a single source s with D outgoing edges and a single virtual destination $d_0$ with D incoming edges. The vertex min-cut between the source and this virtual destination has capacity of at least D. Hence, by the max-flow min-cut result, there exists a (trivial) network code that solves the single-flow unicast problem from s to $d_o$. This implies, (by Theorem 2 in Ho, et al, "A random linear network coding approach to multicast," IEEE Trans. Inf. Theory, vol. 52, pp. 4413-4430, October 2006) that:

$$\mathbb{P}(\text{rank}(H_s) < D) \leq 1 - (1 - 2^{-K})^{|E|}$$

where E represents the edge set of the network. Using the union bound, one can show:

$$\mathbb{P}(U_{s \in S}\{\text{rank}(H_S) < D\}) \leq S(1 - (1 - 2^{-K})^{|E|}).$$

As $K \to \infty$, the right-hand side of the above expression approaches zero. More precisely, for block length:

$$K \geq \log\left(\frac{1}{1 - (1 - \delta/S)^{1/|E|}}\right) \quad (2)$$

with probability at least $1 - \delta$ that all transfer matrices $H_s$ are invertible.

Figure 5:
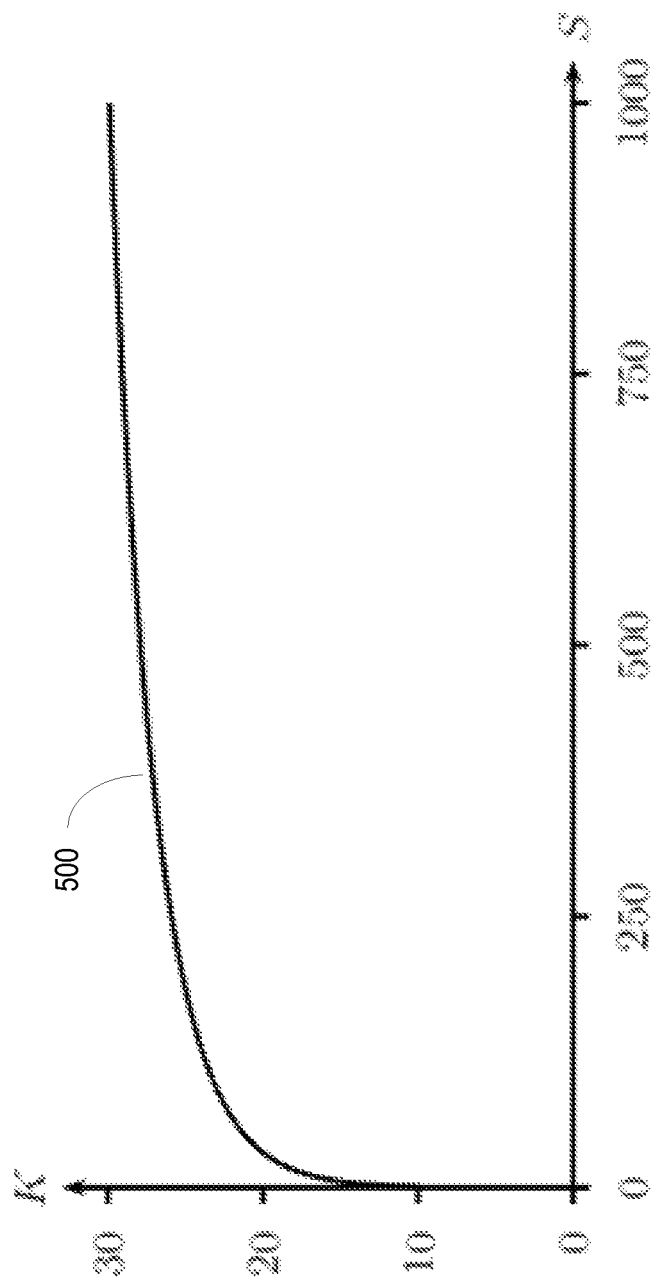
FIG. 5 is a plot of the block length (K) for messages transmitted over a network as a function of network size (S) according to some embodiments.

FIG. 5 is a plot 500 of the block length (K) for messages transmitted over a network having a size (S) according to some embodiments. The block length satisfying equation (2) is shown on the vertical axis and the system size in arbitrary units is shown on the horizontal axis. The plot 500 shows that the scaling of block length with the network size is quite benign and this is assumed to be the case in the following discussion. The following discussion also assumes that each source s knows its transfer matrix, e.g. based on feedback received in response to pilot signals transmitted by each source s, as discussed herein.

Sums can be computed over the network-coded system using linear operations performed by the intermediate nodes. Since the linear operations of the intermediate nodes are fixed, only the operations of the source nodes in the destination nodes are left to describe or specify. Consider a source node s and its message bits $w_{sd}[k]$ for $d \in D$ and $k \in \{1, 2, \ldots, K\}$. Map the K bits $(w_{sd}[k])_{k \in \{1, 2, \ldots, K\}}$ into the finite field symbol $w_{sd} \in \mathbb{F}_{2^K}$. This mapping of bits to the finite field symbol requires some care and is discussed below in more detail. From the finite field symbols $w_{sd}$, form the vector:

$$w_s \triangleq (w_{sd})_{d \in D} \in \mathbb{F}_{2^K}^D.$$

Each source s uses a linear precoder to map the message vector $w_s$ to the vector:

$$x_s = H_s^{-1} w_s$$

of signals injected into the network. This operation is possible because $H_s$ is invertible by construction.

Using equation (1), the signal received at the destination nodes is then given by:

$$y = \sum_{s \in S} H_s x_s$$

$$= \sum_{s \in S} H_s H_s^{-1} w_s$$

$$= \sum_{s \in S} w_s$$

where the sum is over the finite field $\mathbb{F}_{2^K}$. The observed signals at each of the destination nodes may be expressed as:

$$y_d = \Sigma_{s \in S} w_{sd}. \quad (3)$$

The symbols $y_d$ and $w_{sd}$ and the sum operation in equation (3) are performed in the extension field $\mathbb{F}_{2^K}$. However, the aim of each destination node is to recover the sums $\oplus_{s \in S} w_{sd}[k]$ over the base field $\mathbb{F}_2$. In order to enable this computation, the mapping from the message bits $w_{sd}[k] \in \mathbb{F}_2$ to the finite field symbol $w_{sd} \in \mathbb{F}_{2^K}$ needs to be done with some care.

The extension field $\mathbb{F}_{2^K}$ can be constructed as $\mathbb{F}_2[\alpha]/\rho(\alpha)$, i.e., the congruence classes of polynomials (in the indeterminate $\alpha$) over $\mathbb{F}_2$ modulo the irreducible polynomial $\rho(\alpha)$ of degree K. Choose the mapping from the K bits $w_{sd}[k] \in \mathbb{F}_2$, $k \in \{1, 2, \ldots, K\}$, to the symbol $w_{sd} \in \mathbb{F}_{2^K}$ as:

$$w_{sd} \equiv w_{sd}[1] + w_{sd}[2]\alpha + w_{sd}[3]\alpha^2 + \ldots + w_{sd}[K]\alpha^{K-1}$$
$$(\text{mod } \rho(\alpha)).$$

Using this expression, equation (3) can be rewritten as:

$$y_d = \sum_{s \in S} w_{sd}$$

$$\equiv \left(\bigoplus_{s \in S} w_{sd}[1]\right) + \left(\bigoplus_{s \in S} w_{sd}[2]\right)\alpha + \left(\bigoplus_{s \in S} w_{sd}[3]\right)\alpha^2 + \ldots +$$
$$\left(\bigoplus_{s \in S} w_{sd}[K]\right)\alpha^{K-1}$$
$$(\bmod p(\alpha)).$$

In the above expression, the first (upper) sum is over the extension field $\mathbb{F}_{2^K}$ and in the second (lower) sum is over the base field $\mathbb{F}_2$. Thus, each destination node can recover the desired sums of the message bits over $\mathbb{F}_2$ from the K coefficients of $y_d$.

Figure 6:
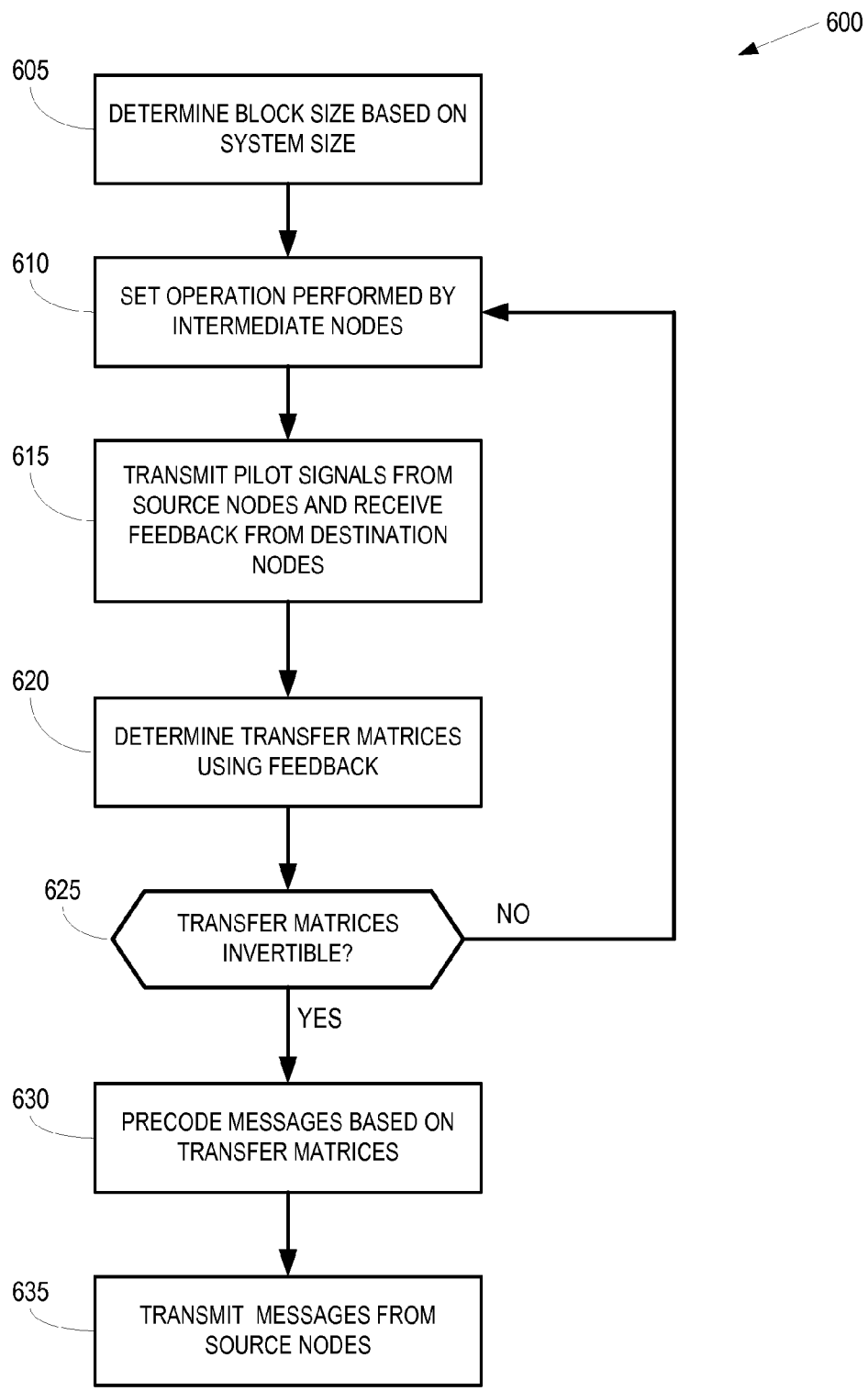
FIG. 6 is a flow diagram of a method for performing a multiple sums computation in a network according to some embodiments.

FIG. 6 is a flow diagram of a method 600 for performing a multiple sums computation in a network according to some embodiments. The method 600 may be implemented in a network controller, one or more source nodes, one or more intermediate nodes, one or more destination nodes, or combinations thereof. Examples of these entities are shown in FIGS. 1-3. At block 605, a block size for messages transmitted to the network is determined based on a system size, which may be estimated based on a number of source nodes, a number of intermediate nodes, a number of destination nodes, a number of edges, and the like. In some embodiments, the block size may be determined using equation (2) or a representation of the block size as a function of system size such as the plot 500 shown in FIG. 5.

At block 610, the linear operation performed by the intermediate nodes may be set. The linear operation may be set deterministically, non-deterministically, or randomly, as discussed herein. The linear operation may be determined by an external entity such as a network controller or may be determined by the individual intermediate nodes. At block 615, source nodes transmit (or re-transmit during subsequent iterations if a non-invertible transfer matrix was found) pilot signals through the network and then receive feedback signals from the destination nodes. At block 620, the source nodes determine their transfer matrices by comparing the translated pilot signals to the feedback signals received from the destination nodes in response to the pilot signals.

At decision block 625, the source nodes may determine whether the transfer matrices are invertible. If not, the method 600 flows back to block 610 and the linear operation performed by the intermediate nodes is modified or reset, e.g., by selecting a new set of random weights, and the pilot signal is re-transmitted at block 615. Once the source nodes determine that the transfer matrices are invertible, the source node can precode (at block 630) messages based on the invertible transfer matrices and then transmit the messages over the network at block 635.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    transmitting, from a first source node, a first transmission vector formed by multiplying a vector of input values and an inverse of a transfer matrix that relates vectors transmitted from the first source node via a plurality of intermediate nodes to vectors received at a plurality of destination nodes, wherein each of the intermediate nodes transmits a vector formed by a linear operation performed on received vectors, and wherein the linear operation is such that propagation of the first transmission vector through the plurality of intermediate nodes produces, at the plurality of destination nodes, predetermined linear combinations of the first transmission vector and at least one second transmission vector transmitted by at least a second source node.

2. The method of claim 1, further comprising:
    determining the linear operation so that propagation of the first transmission vector through the plurality of intermediate nodes produces the predetermined linear combinations of the first transmission vector and the at least one second transmission vector at the plurality of destination nodes.

3. The method of claim 2, wherein determining the linear operation comprises selecting random weights to apply to perform a linear combination of the received vectors over a finite field.

4. The method of claim 2, wherein determining the linear operation comprises selecting a deterministic linear operation for each of the plurality of intermediate nodes, wherein the deterministic linear operation generates the linear combinations at the plurality of destination nodes.

5. The method of claim 4, wherein selecting the deterministic linear operation for each of the plurality of intermediate nodes comprises selecting a weighted addition of the received vectors over a finite field.

6. The method of claim 2, further comprising:
transmitting at least one pilot signal from the first source node; and
determining the transfer matrix based on feedback received from the plurality of destination nodes in response to transmitting the at least one pilot signal.

7. The method of claim 6, further comprising:
modifying the linear operation performed at the intermediate nodes in response to determining that the transfer matrix is not invertible;
re-transmitting the at least one pilot signal from the first source node; and
determining the transfer matrix based on feedback received from the plurality of destination nodes in response to transmitting the at least one pilot signal.

8. The method of claim 1, further comprising:
determining a block size for the first transmission vector based on at least one of a number of the plurality of intermediate nodes and a number of edges connecting a plurality of source nodes comprising the first source node, the plurality of intermediate nodes, and the plurality of destination nodes.

9. A first source node for implementation in a network of multiple interconnected nodes, the fist source node comprising:
a non-transitory computer readable storage medium; and
a processor configured to execute instructions stored on the non-transitory computer readable storage medium to transmit a first transmission vector formed by multiplying a vector of input values and an inverse of a transfer matrix that relates vectors transmitted from the first source node via a plurality of intermediate nodes to vectors received at a plurality of destination nodes, wherein each of the intermediate nodes transmits a vector formed by a linear operation performed on received vectors, and wherein the linear operation is such that propagation of the first transmission vector through the plurality of intermediate nodes produces, at the plurality of destination nodes, predetermined linear combinations of the first transmission vector and at least one second transmission vector transmitted by at least a second source node.

10. The apparatus of claim 9, wherein the linear operation is determined so that propagation of the first transmission vector through the intermediate nodes produces the predetermined linear combinations of the first transmission vector and at least one second transmission vector at the plurality of destination nodes.

11. The apparatus of claim 10, wherein the linear operation is a weighted addition over a finite field using random weights applied to the received vectors over the finite field.

12. The apparatus of claim 10, wherein the linear operation is a deterministic linear operation performed over a finite field by each of the plurality of intermediate nodes, wherein the deterministic linear operation generates the linear combinations at the plurality of destination nodes.

13. The apparatus of claim 12, wherein the deterministic linear operation is a weighted addition of the received vectors over the finite field.

14. The apparatus of claim 10, wherein the first source node is to transmit at least one pilot signal and determine the transfer matrix based on feedback received from the plurality of destination nodes in response to transmitting the at least one pilot signal.

15. The apparatus of claim 10, wherein the linear operation performed at the intermediate nodes is modified in response to determining that the transfer matrix is not invertible, and wherein the first source node transmits the at least one pilot signal in response to modification of the linear operation and determines the transfer matrix based on feedback received from the plurality of destination nodes in response to transmitting the at least one pilot signal.

16. The apparatus of claim 9, wherein a block size for the first transmission vector is determined based on at least one of a number of the plurality of intermediate nodes and a number of edges connecting a plurality of source nodes comprising the first source node, the plurality of intermediate nodes, and the plurality of destination nodes.

17. An intermediate node for deployment in a network comprising a plurality of source nodes, intermediate nodes, and destination nodes, the intermediate node comprising:
a non-transitory computer readable storage medium; and
a processor configured to execute instructions stored on the non-transitory computer readable storage medium to receive a plurality of first vectors and form a plurality of second vectors by applying a linear operation to the plurality of first vectors, wherein the linear operation is determined such that propagation of the first transmission vector through the intermediate nodes produces predetermined linear combinations of vectors transmitted by the source nodes at the plurality of destination nodes.

18. The apparatus of claim 17, wherein the linear operation is a weighted addition of the received vectors over a finite field.

19. The apparatus of claim 17, wherein the linear operation is a weighted addition over a finite field using random weights applied to the received vectors over the finite field.

20. The apparatus of claim 19, wherein the linear operation performed at the intermediate nodes is modified by selecting new random weights in response to a transfer matrix that relates vectors transmitted from the plurality of source nodes to vectors received at the plurality of destination nodes not being invertible.

* * * * *